(12) United States Patent
Yoshii et al.

(10) Patent No.: US 7,239,417 B2
(45) Date of Patent: Jul. 3, 2007

(54) DISTRIBUTION SYSTEM FOR DIGITAL IMAGE CONTENT AND REPRODUCING METHOD AND MEDIUM RECORDING ITS REPRODUCTION PROGRAM

(75) Inventors: Junko Yoshii, Tokyo (JP); Masato Utsumi, Tokyo (JP)

(73) Assignee: Fujiyama Co., Ltd., Tokyo (JP)

( * ) Notice: Subject to any disclaimer, the term of this patent is extended or adjusted under 35 U.S.C. 154(b) by 715 days.

(21) Appl. No.: 10/168,974

(22) PCT Filed: Sep. 20, 2001

(86) PCT No.: PCT/JP01/08190

§ 371 (c)(1),
(2), (4) Date: Oct. 21, 2002

(87) PCT Pub. No.: WO02/37841

PCT Pub. Date: May 10, 2002

(65) Prior Publication Data

US 2003/0090711 A1 May 15, 2003

(30) Foreign Application Priority Data

Nov. 2, 2000 (WO) .................. PCT/JP00/07730

(51) Int. Cl.
*G06K 15/00* (2006.01)
*G06F 15/16* (2006.01)

(52) U.S. Cl. .................. 358/1.18; 358/1.12

(58) Field of Classification Search .......... 358/540, 358/538, 1.18, 1.1, 1.12, 3.28; 709/231
See application file for complete search history.

(56) References Cited

U.S. PATENT DOCUMENTS 5,909,551 A * 6/1999 Tahara et al. .............. 709/231
2001/0044726 A1* 11/2001 Li et al. .................... 704/277
2002/0007493 A1* 1/2002 Butler et al. ............... 725/109

FOREIGN PATENT DOCUMENTS

JP 11331701 A * 11/1999

* cited by examiner

*Primary Examiner*—Gabriel I. Garcia
(74) *Attorney, Agent, or Firm*—Sughrue Mion, PLLC (57) ABSTRACT

A distribution system for digital image content, a method of reproducing digital image content, and a medium recording a program for reproducing digital image content are disclosed. The system comprise: a first distribution means (21) for distributing digital image data (11); a second distribution means (22) for distributing secondary data (12); a first reproduction means (24) for reproducing the digital image data (11); a second reproduction means (25) for reproducing the secondary data (12); and an output means (26) for superimposing the two reproduced data. The secondary data (12) is prepared using a markup language such that a reproduction start point and a reproduction end point correspond to an image frame-specific code for specifying an image of the digital image data (11) and that the secondary data (12) distributable from a different server having a different IP address is reproduced synchronously with the reproduction of the digital image data (11).

3 Claims, 9 Drawing Sheets

SECONDARY DATA 12

```
<title>DRIVE, DRIVE, DRIVE
<sub>···
       ········
       ········
<window width="200"height="30"bgcolor=·>
<front charset="x-sjis"color="white">
<center>
<point in="%01000015"/> I'm glad it's fine today
<point out="%01000020"/><clear>
<point in="%01000037"/> Good morning, Sam
<point out="%01000045"/><clear>
<point in="%01000100"/> Hi, Cathy!
<point out="%01000108"/><clear>
       ········
       ········
       ········
</center>
</font>
</window>
```

FIG. 6

FIG. 7
DIGITAL IMAGE CONTENT DISTRIBUTION SYSTEM 40

FIG. 8

DISTRIBUTION SYSTEM FOR DIGITAL IMAGE CONTENT AND REPRODUCING METHOD AND MEDIUM RECORDING ITS REPRODUCTION PROGRAM

TECHNICAL FIELD

The present invention relates to a technique for distributing and reproducing digital image content consisting of digital image data and secondary data corresponding to the digital image data, and more particularly to its distribution system, reproducing method and medium recording its reproduction program.

BACKGROUND ART

Figure 1:
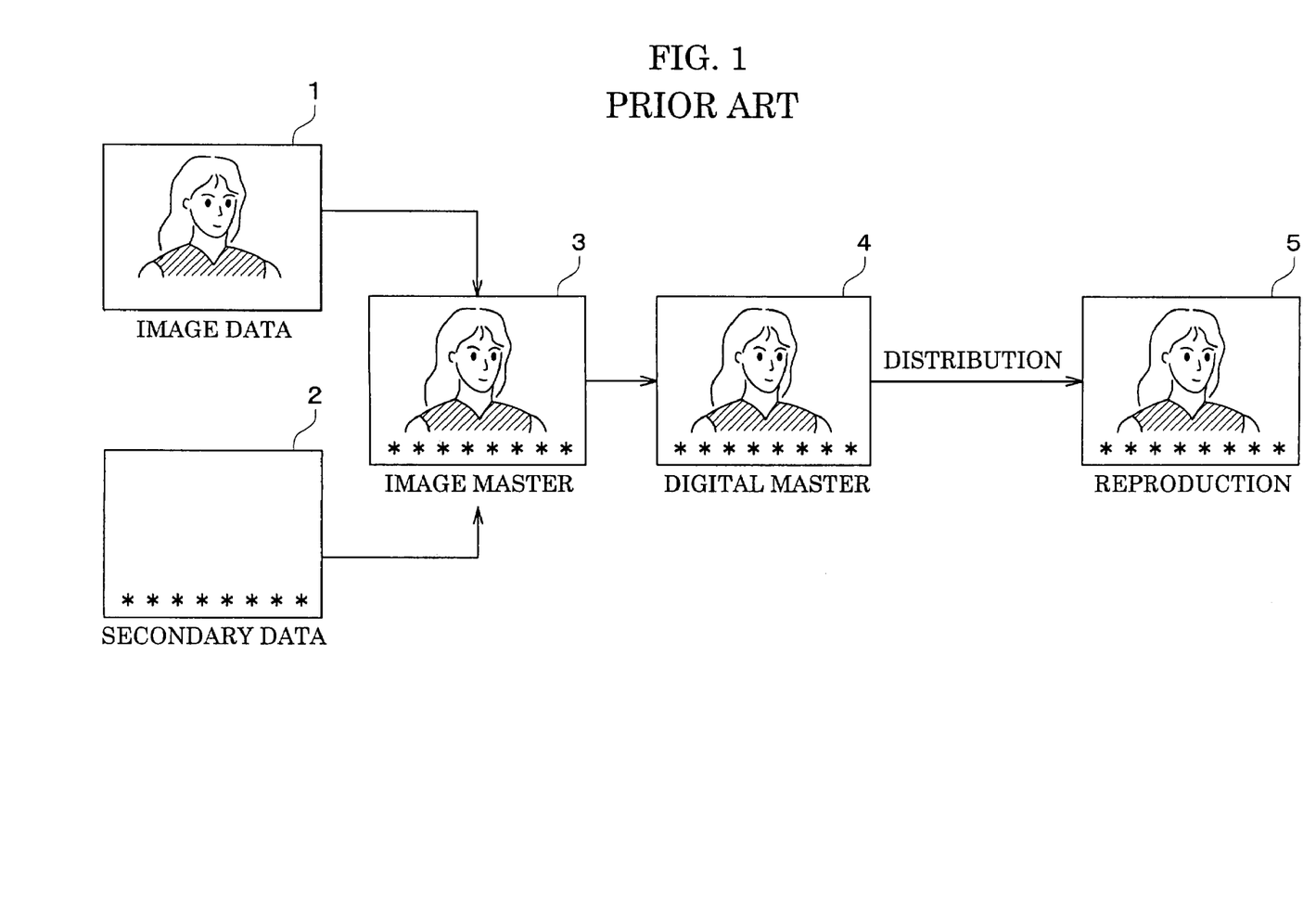
FIG. 1 is a view explaining distribution and reproduction of digital image content according to prior art.

In recent years, digitalization of image content such as movies or broadcast programs has been proceeding rapidly. As a result, digitalized image content has been distributed to an audience through digital broadcasting or Internet distribution. In this instance, as image content to be broadcasted or distributed, content in which image date and secondary data are previously and integrally included has been used. With reference to FIG. 1, a conventional distribution method for digital image content will be described. FIG. 1 is an explanatory view illustrating the procedure for preparing, distributing, and reproducing conventional digital content.

As shown in FIG. 1, image data 1 and secondary data 2 such as subtitles are superimposed together to prepare one image master 3. The secondary data 2 incorporated in this image master 3 is treated as image data. Next, the image master 3 is digitalized to prepare a digital master 4. This digital master 4 is a master file for the image content that is distributed through Internet and the like. The image content accommodated in the digital master 4 is reproduced at the receiver side, and is viewed as the digital image content 5.

When the conventional image content is distributed through Internet and the like, digital code is compressed and distributed at the transmitter side, and the compressed digital code is decrypted and reproduced at the receiver side. If the throughput capacity of the receiver side is relatively low, a problem arises in that missing frames and flickering of the subtitles occur at the same time.

Further, when a correction is necessary during the edit until the digital master 4 is prepared, the correcting operation causes a lot of difficulties. For example, if the secondary data requires a correction, the secondary data is firstly corrected, and subsequently, the image master 3 and the digital master 4 are prepared again.

Furthermore, subtitles or advertisements are often superimposed while a digital broadcasting program is on the air. This can be done by synthesizing the subtitles onto the image date at predetermined timings or by switching the image data to the advertisement data. In this instance, the subtitles or the airplay schedules of the advertisements are written on a program schedule table, which is so-called a "cue sheet", and the predetermined subtitles or advertisements are broadcasted on schedule of the air time.

When sound of a foreign film is translated to prepare subtitles, subtitles are prepared for each translating word, and the edit is carried out by the same operation as above. In the aforementioned procedure of the edit, a great effort is required for each translating word, which indirectly discourages a production of multi-kinds of subtitles. Accordingly, in the conventional distribution method for digital image content, there is a drawback in that the operations from edit to distribution require a great effort and a lot of difficulties.

DISCLOSURE OF INVENTION

In order to eliminate the above drawbacks, the present invention seeks to provide a distribution system for digital image content, a reproducing method of digital image content, and a medium recording a reproduction program, wherein image data and secondary data are separately distributed and reproduced synchronously at the receiver side such that operations from edit to distribution are carried out effectively without loss.

In order to achieve the above object, the following inventions are described in accordance with the principle of the present invention. Herein, the term "secondary data" in the present invention indicates data such as subtitles, dubbing, and sign language. And data consisting of character information, graphics information, image information, or sound information can be treated.

According to the invention, a digital image content distribution system comprises a first distribution means for distributing digital image data, a second distribution means for distributing secondary data prepared in accordance with the digital image data, a first reproduction means for reproducing the distributed digital image data, a second reproduction means for reproducing the secondary data, and an output means for superimposing and outputting the reproduced digital image data and the reproduced secondary data.

The secondary data is prepared with the use of a markup language such that a reproduction start point and a reproduction end point correspond to an image frame-specific code for specifying an image frame of the digital image data, and the secondary data is reproduced synchronously with the digital image data in a manner such that the second reproduction means leads out the reproduction start point and the reproduction end point of the secondary data corresponding to the image frame to be reproduced during the reproduction of the digital image data.

In this distribution system, digital image data and secondary data are prepared and distributed separately. Since secondary data such as subtitles is considerably small in size when compared with digital image data, even if the throughput capacity of the receiver side is relatively low, flickering of the subtitles arisen in the prior art distribution system will be eliminated.

A reproduction start point and a reproduction end point are allocated to the secondary data so as to correspond to an image frame-specific code contained in the digital image data. When the image data is reproduced at the receiver side, the reproduction start point and the reproduction end point of the secondary data are led out so that the secondary data is reproduced synchronously with the image data.

In this distribution system, unlike the prior art system, the preparation of the image master by superimposing subtitles onto the image data and the preparation of the digital master become unnecessary. Further, even if a correction is required for the secondary data, it is possible to correct the secondary data without a correction of the digital image data. This facilitates a correction of the secondary data and contributes to improve the quality.

Further, since the secondary data is prepared with the use of a markup language, as the secondary data, multimedia such as character, sound, and image can be treated. In other words, dubbing or sign language can be treated in addition to subtitles. The secondary data may be prepared by variety of translating languages so that users can select a desired language. The size and the color of the character may vary.

According to the invention, a digital image content distribution system comprises a server distributing digital image data and secondary data corresponding to the digital image data, and a user terminal reproducing the distributed digital image data and the distributed secondary data, the server and the user terminal being connected each other through Internet, so that the digital image content is distributed from the server to the user terminal.

The server includes an image data file for storing the digital image data, a secondary data file for storing the secondary data, a distribution information file for storing distribution information relating to the digital image data and the secondary data, a distribution means for distributing the digital image data and the secondary data in accordance with a requirement from the user terminal, and an information supply means for supplying the user terminal with the distribution information.

The secondary data is prepared with the use of a markup language such that a reproduction start point and a reproduction end point correspond to an image frame-specific code for specifying an image frame of the digital image data, and when the digital image data and the secondary data are distributed in accordance with a requirement from the user terminal, the secondary data is reproduced synchronously with the digital image data in a manner such that the reproduction start point and the reproduction end point of the secondary data corresponding to the image frame to be reproduced are led out during the reproduction of the digital image data.

In this distribution system, the digital image data and the secondary data are distributed through Internet. The digital image data and the secondary data are stored in the server. When the user requires a distribution, the digital image data is reproduced at the receiver side, and the secondary data is reproduced synchronously with the digital image data. For example, if variety of secondary data consisting of dubbing or sign language is stored in the server, the user can select desired secondary data according to his/her favor or purpose.

According to the invention, a digital image content distribution system comprises a first server distributing digital image data, a second server distributing secondary data corresponding to the digital image data, and a user terminal reproducing the distributed digital image data and the distributed secondary data, the first server, the second server, and the user terminal being connected each other through Internet, so that the digital image content is distributed from the server to the user terminal.

The first server includes an image data file for storing the digital image data, an image data distribution information file for storing distribution information relating to the digital image data, a distribution means for distributing the digital image data in accordance with a requirement from the user terminal, and an information supply means for supplying the user terminal with the distribution information relating to the digital image data. The second server includes a secondary data file for storing the secondary data, a secondary data distribution information file for storing distribution information relating to the secondary data, a distribution means for distributing the secondary data in accordance with a requirement from the user terminal, and an information supply means for supplying the user terminal with the distribution information relating to the secondary data.

The secondary data is prepared with the use of a markup language such that a reproduction start point and a reproduction end point correspond to an image frame-specific code for specifying an image frame of the digital image data, and when the digital image data and the secondary data are distributed in accordance with a requirement from the user terminal, the secondary data is reproduced synchronously with the digital image data in a manner such that the reproduction start point and the reproduction end point of the secondary data corresponding to the image frame to be reproduced are led out during the reproduction of the digital image data.

In this distribution system, the digital image data and the secondary data are distributed from different servers through Internet. The digital image data and the secondary data a restored in different servers. When the user requires a distribution to each server, the digital image data and the secondary data are distributed from the respective servers. The digital image content is prepared by reproducing the secondary data synchronously with the digital image data reproduced at the receiver side. In other words, the secondary data can be distributed from a different server having a different IP address. Since the secondary data is administered independently, it is possible to get a sponsor for the secondary data itself, enhancing the commercial value of the secondary data alone. Furthermore, the server only for distributing the secondary data may be a server with low data processing capacity.

According to the invention, in the above digital image content distribution system using Internet, the secondary data is prepared by a plurality of translating languages, and advertisements corresponding to a distributed translating language may be automatically distributed.

In this distribution system, for example, advertisements of Korean companies with Korean language are distributed when the secondary data with Korean subtitles is selected, and advertisements of Chinese companies with Chinese language are distributed when the secondary data with Chinese subtitles is selected. This enables to distribute appropriate advertisements corresponding to respective translating languages of the secondary data. Therefore, by distributing the secondary data accompanied with advertisements with a corresponding translating language, the user naturally watches and understands the advertisements without awareness.

According to the invention, a method of reproducing digital image content comprises the steps of: preparing secondary data with the use of a markup language such that a reproduction start point and a reproduction end point correspond to an image frame-specific code for specifying an image frame of digital image data; and reproducing the secondary data synchronously with the digital image data by leading out the reproduction start point and the reproduction end point of the secondary data corresponding to the image frame to be reproduced during the reproduction of the digital image data.

In this reproduction method, the secondary data can be reproduced synchronously with the digital image data, even if the secondary data is character information, sound information, or graphics information. Further, since the reproduction of the secondary data is not dependent on the coding method of the digital image data, a common hardware can be used for both reproducing the digital image data and reproducing the secondary data. Therefore, if software for reproduction is installed in the existing personal computer, the digital image data and the secondary data can be readily reproduced.

According to the invention, a method of reproducing digital image content comprising the steps of: inputting designation signals indicating a reproduction start point and a reproduction end point into a secondary data preparation means, and with the use of a markup language, preparing secondary data in which the reproduction start point and the reproduction end point are designated so as to correspond to an image frame-specific code for specifying an image frame of digital image data; distributing from a distribution means to a user terminal the digital image data without processing; and reproducing the secondary data at the user terminal synchronously with the digital image data by leading out the reproduction start point and the reproduction end point of the secondary data corresponding to the image frame to be reproduced during the reproduction of the digital image data.

In this reproduction method, the reproduction start point and the reproduction end point are designated on the secondary data by inputting designation signals, and for example, if a setting is made such that the input of the designation signals is available by using one button of the secondary data preparation means such as a keyboard of a personal computer, the operation for designating the reproduction start point and the reproduction end point on the secondary data can be eased a lot. Therefore, the operations from preparation of the secondary data to distribution can be carried out much more effectively. Further, since the digital image data is distributed from the distribution means to the user terminal without processing, the operation required for distribution of the digital image content is carried out much more effectively, leading to reduction of the cost.

According to the invention, a method of reproducing digital image content comprises the steps of: specifying an image frame by allocating an image frame-specific code to digital image data so as to correspond to a reproduction start point and a reproduction end point of secondary data prepared with the use of a markup language; and reproducing the secondary data synchronously with the digital image data by leading out the reproduction start point and the reproduction end point of the secondary data corresponding to the image frame to be reproduced during the reproduction of the digital image data. This enables the secondary data to be reproduced effectively in the sequence suitable for the working environment.

According to the invention, there is provided a recording medium recording a program which makes an information processing device reproduce secondary data synchronously with digital image data, wherein the secondary data is prepared with the use of a markup language such that a reproduction start point and a reproduction end point correspond to an image frame specific code for specifying an image frame of the digital image data.

The program reproduces the secondary data synchronously with the digital image data. The secondary data is reproduced synchronously with the digital image data by leading out a reproduction start point and a reproduction end point of the secondary data corresponding to an image frame to be reproduced during the reproduction of the digital image data, and the reproduced digital image data and the reproduced secondary data are superimposed and outputted.

In the above digital image content distribution system using Internet, such a recording medium recording the reproduction program may be a recording device such as a magnetic disk in the server. This reproduction program may be stored in a server on the Internet so that when the user requires a distribution of the digital image data and the secondary data, the reproduction program is downloaded together with the secondary data. The reproduction program may be distributed to the user in the form of a recording medium such a CD-ROM. In this instance, the reproduction program may be provided as a commercial product widely to users.

MODES FOR CARRYING OUT THE INVENTION

Preferred embodiments of the present invention will be described below. The following embodiments are for illustrative purpose only, and they are not limit the scope of the invention. Therefore, it should be understood by those skilled in the art that each element or the whole elements of the invention may be modified or replaced with equivalents and such an embodiment still falls in the scope of the invention.

Figure 2:
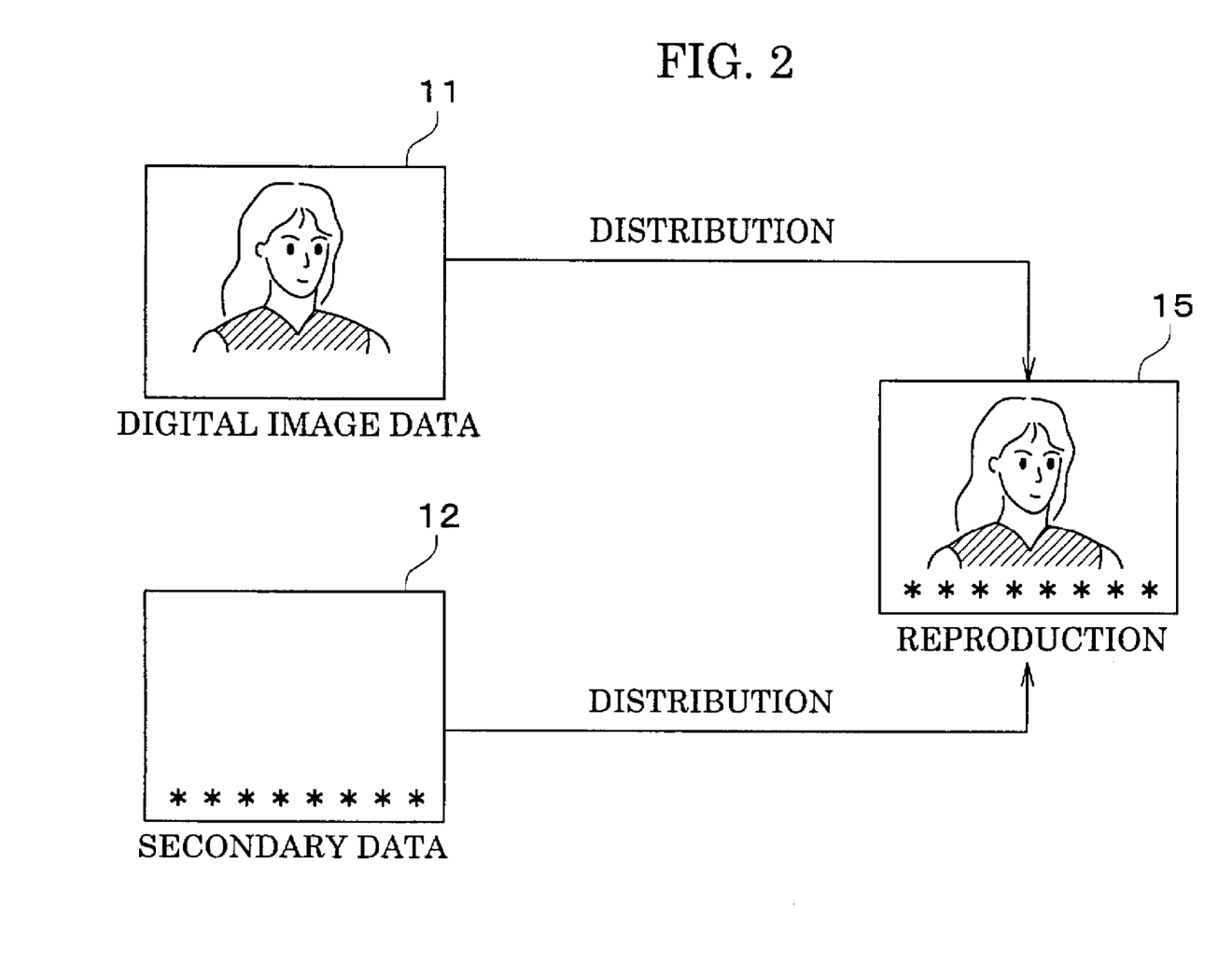
FIG. 2 is a view explaining distribution and reproduction of digital image content according to the present invention.

With reference to FIG. 2, the outline of the operation according to the present invention will be described. FIG. 2 is a view explaining distribution and reproduction of digital image content according to the present invention. In FIG. 2, digital image data 11 and secondary data 12 are digitally coded data, and these data 11, 12 are separately distributed. The digital image data 11 and the secondary data 12 are reproduced respectively at the receiver side such that the two reproduction data are superimposed and outputted as digital image content 15.

Figure 3:
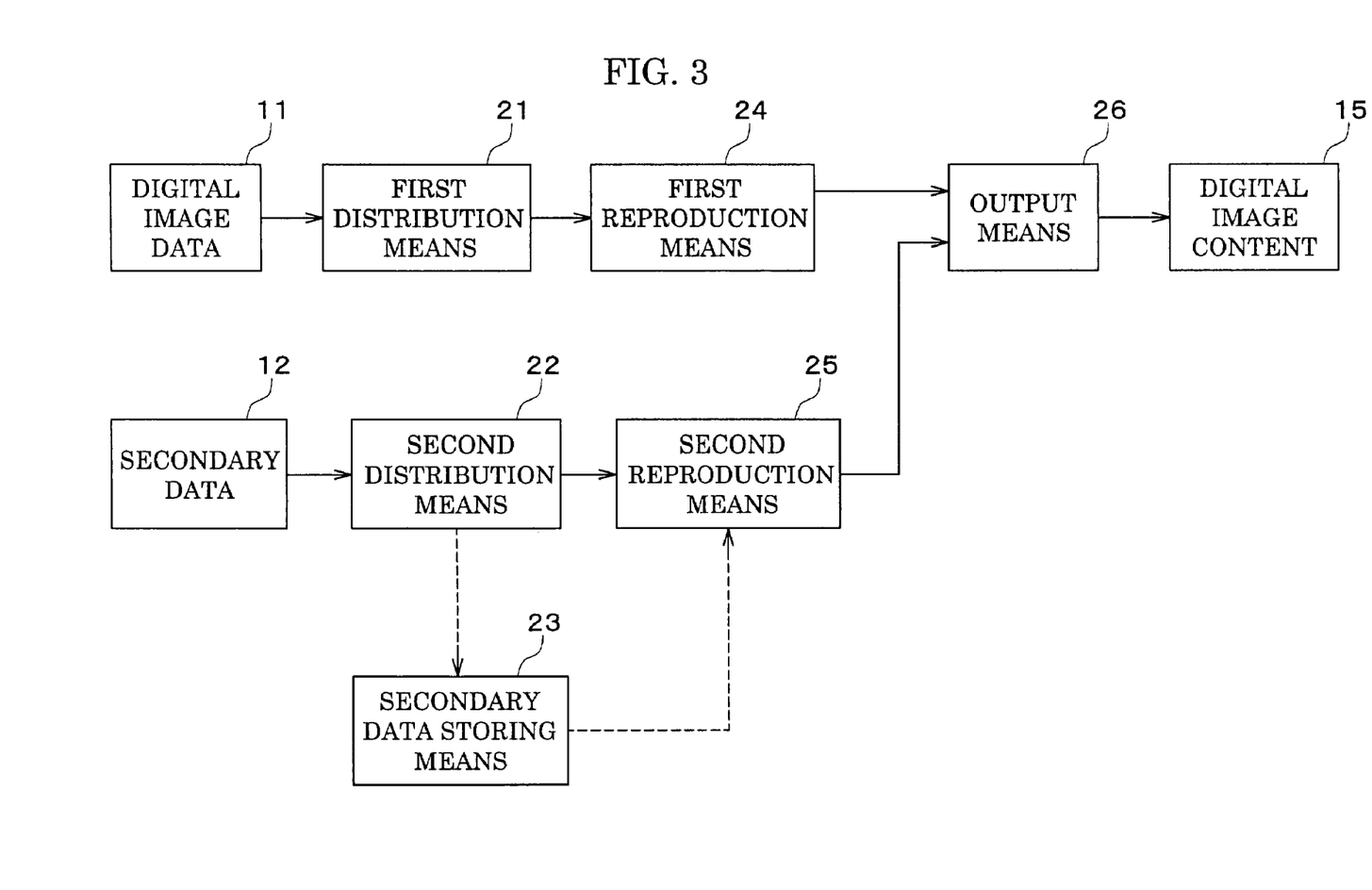
FIG. 3 is a block diagram illustrating the configuration of a digital image content distribution system according to the present invention.

With reference to FIG. 3, a configuration of a digital image content distribution system according to the invention will be described. Herein, FIG. 3 is a block diagram illustrating the configuration of a digital image content distribution system according to the present invention. In FIG. 3, a first distribution means 21 distributes the digital image data 11 to users, and a second distribution means 22 distributes the secondary data 12 to users. A communication means or a broadcasting means is used as the first distribution means 21 and the second distribution means 22. For example, media such as Internet, digital broadcasting, and CATV may be used. Mailing service may be used for distribution.

A first reproduction means 24 reproduces the digital image data 11 distributed by the first distribution means 21. The first reproduction means 24 achieves the function by a program reproducing the digital image data. In the case that the digital image data 11 is distributed through a medium such as Internet and the distributed data is reproduced at the receiver side while the receiver side is receiving the data (streaming reproduction), the program comprises a real time reproduction protocol reproducing the digital image data 11 in real time.

A second reproduction means 25 reproduces the secondary data 12 synchronously with the reproduction of the digital image data 11. The second reproduction means 25 achieves the function by a program reproducing the secondary data 12 in such a manner as to lead out a reproduction start point and a reproduction end point of the secondary data 12 corresponding to an image frame to be reproduced during the reproduction of the digital image data 11.

When the digital image data 11 and the secondary data 12 are distributed through Internet and the like, the receiver side temporarily stores the distributed secondary data 12 in the secondary data storing means 23. The data size of the secondary data 12 is considerably small when compared with the data size of the digital image data 11. Synchronizing the streaming reproduction of the secondary data 12 and the streaming reproduction of the digital image data 11 at the receiver side causes an extremely low use efficiency of the communication line. For this reason, it is effective that the secondary data storing means 23 is provided at the receiver side for downloading the secondary data 12 and the secondary data 12 is led out from the secondary data storing means 23 to reproduce the secondary data 12 synchronously with the streaming reproduction of the digital image data 11.

An output means 26 superimposes the reproduction data of the digital image data 11 and the reproduction data of the secondary data 12 and outputs them. The superimposed data are outputted as the digital image content 15.

Figure 4:
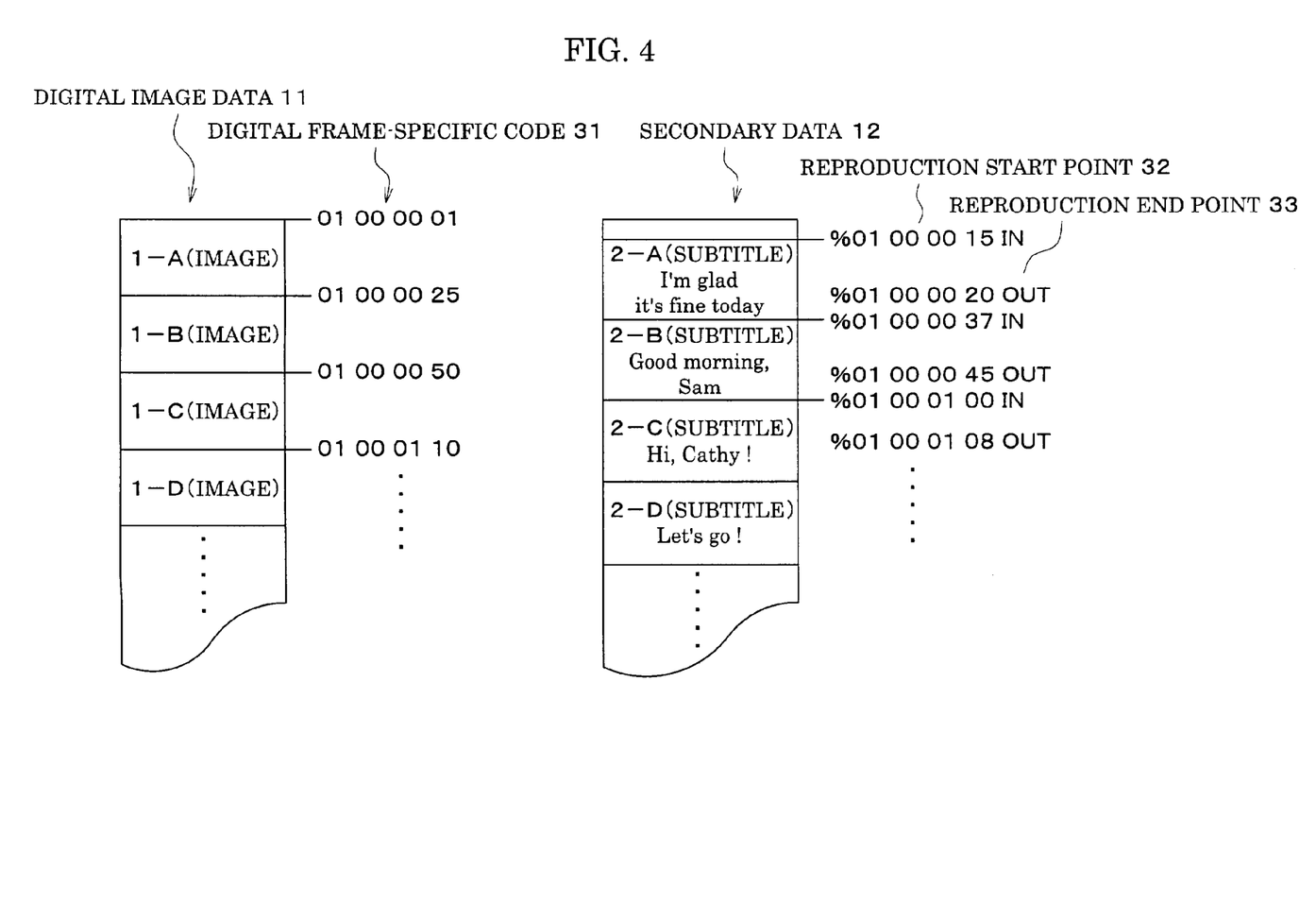
FIG. 4 is an explanatory view schematically showing data structures of digital image data and secondary data.

Next, with reference to FIG. 4, data structures of the digital image data 11 and the secondary data 12 will be described. FIG. 4 is an explanatory view schematically showing data structures of the digital image data 11 and the secondary data 12. In FIG. 4, the digital image data 11 consists of a plurality of images such as digitally coded images 1-A, 1-B, 1-C, 1-D, etc. These images are distinguishable by a specific code 31 allocated for each transitional image. Image frame-specific codes 31 are identifiers for specifying transitional images. In the example shown in FIG. 4, the image 1-A is outputted when the image frame-specific code 31 is from 01000001 to 01000025, and the image 1-B is outputted when the image frame-specific code 31 is from 01000025 to 01000050. In the similar manner, the transition of the images 1-C, 1-D, etc., is in-turn carried out corresponding to the value of the image frame-specific code 31.

For example, if the secondary data 12 is subtitles, the secondary data 12 comprises a plurality of subtitles such as digitally coded subtitles 2-A, 2-B, 2-C, 2-D, etc. These subtitles are allocated for each transitional image such that a reproduction start point 32 and a reproduction end point 33 correspond to its image frame-specific code 31 of the digital image data 11. The reproduction start point 32 indicates a reproduction start position of the corresponding subtitles, and the reproduction end point 33 indicates a reproduction end position of the corresponding subtitles. In the example of FIG. 4, the code data following after "%" indicates the image frame-specific code 31 of the digital image data 11. Schematically describing, the reproduction of the subtitles 2-A starts (IN) when the image frame-specific code 31 is 01000015, and ends (OUT) when the image frame-specific code 31 is 01000020.

Figure 5:
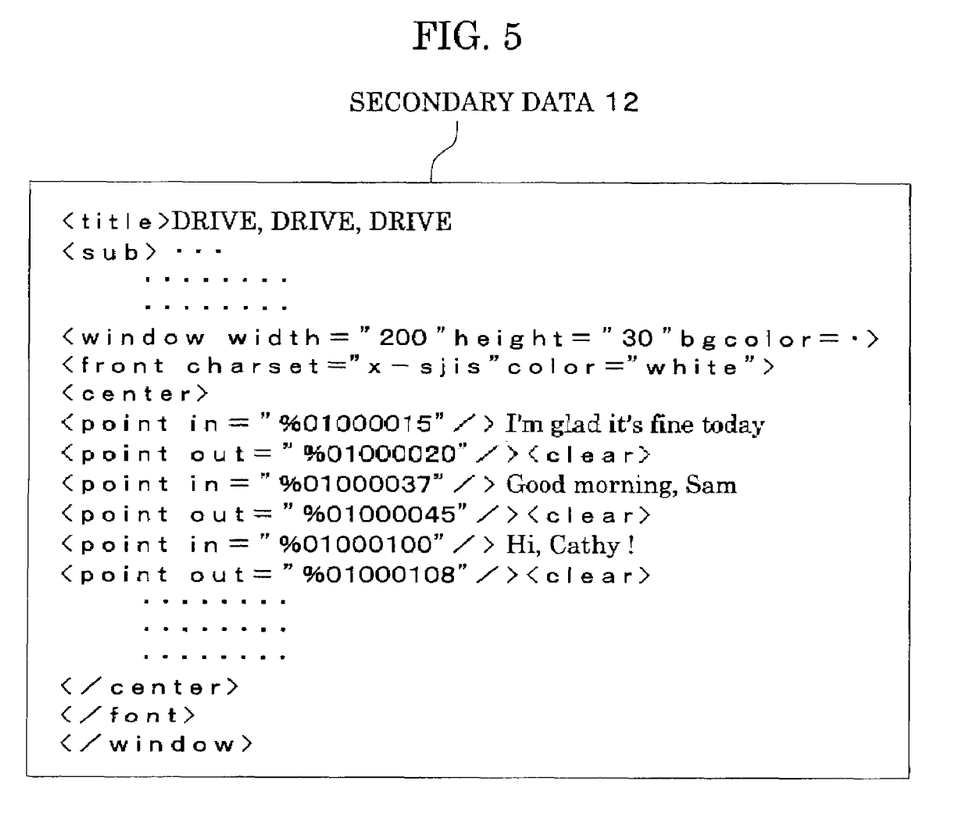
FIG. 5 shows an example of preparing the secondary data with the use of a markup language.

With reference to FIG. 5, preparation of the secondary data 12 will be described. FIG. 5 shows an example of preparing the secondary data with the use of a markup language. In the preparation example of FIG. 5 to be described schematically, the markup language is not limited to a specific language. In FIG. 5, a title tag <title> indicates the title (DRIVE, DRIVE, DRIVE) of this digital image data 11. Following a tag such as a subtitle indicating a profile (abbr. description), a window tag <window> indicates the width (200), the height (30), and the background color (abbr. description) of the subtitle displaying area. A font tag <font> indicates a character code (shifted JIS code) and a character color (white). A tag <center> indicates a displaying position (center) of the subtitles.

A reproduction start tag <point in> and a reproduction end tag <point out> respectively designate a reproduction start point 32 and a reproduction end point 33 for leading out the secondary data 12 corresponding to the image frame-specific code 31 contained in the digital image data 11. Namely, when the image frame-specific code 31 is 01000015, the reproduction of the subtitles "I'm glad it's fine today." is started, and is ended when the image frame-specific code 31 is 01000020. A clear tag <clear> clears the subtitles just after completing the reproduction of the subtitles. In the similar manner, a reproduction start tag <point in> designates a reproduction start position of subtitles and a reproduction end tag <point out> designates a reproduction end position of the subtitles.

As a markup language used for preparation of the secondary data 12, for example, HTML (hypertext markup language), SGML (standard generalized markup language), XML (extensible markup language), and SMIL (synchronized multimedia integration language) may be used.

When the secondary data 12 merely consists of character information, only the layout of the characters has to be set. However, if the secondary data 12 consists of sound information, such as dubbing or sign language, or image information, it is necessary to set the tag independently to express the structure of the characters. For this reason, it is preferable to use SMIL which excels in compatibility to reproduce the image data prepared by XML or an XML-based language.

When the secondary data is character information, the size, the color, and the font of the character, etc., can be freely designated. If part of the secondary data 12 is rewritten, only the corresponding part has to be corrected and there is no need to correct the digital data 11. Further, if a great variety of secondary data 12 such as Japanese, Korean, etc., is prepared, it is possible to provide a user, according to his/her taste or purpose, with the secondary data 12 consisting of a suitable translating language.

When the secondary data is sound information such as dubbing or narration, it is necessary to prepare a sound information file (not shown) separately and to designate a file name of this sound information file following the reproduction start tag. Also, when the secondary data is image information such as sign language, it is necessary to prepare an image information file (not shown) separately and to designate a file name of this image information file following the reproduction start tag.

The second reproduction means 25 leads out and clears the secondary data 12 by in turn leading out the reproduction start tag <point in> and the reproduction end tag <point out> of the secondary data 12 which was prepared with the markup language. Since the secondary data 12 corresponds to the image frame-specific code 31 of the digital image data 11, the secondary data 12 is reproduced synchronously with the reproduction of the digital image data 11. In the case that the secondary data 12 is prepared by sound information or image information, the sound information file or the image information file is led out and reproduced at the reproduction start point 32, and is stopped at the reproduction end point 33.

The output means 26 superimposes and outputs the digital image data 11 reproduced by the first reproduction means 21 and the secondary data 12 reproduced synchronously with the digital image data 11 by the second reproduction means 25. The reproduced secondary data 12 such as subtitles is displayed in a certain displaying area on the window. As described above, since the subtitle displaying position is described by the markup language, it is possible to designate the subtitles at any position, viz., top, bottom, right and left, of the window. Further, when the dubbing and the sign language are simultaneously reproduced as the secondary data 12, sound and sign language image can be outputted respectively from the speakers (not shown) and the window.

As preparation of the secondary data 12, for example, when preparing the secondary data 12 that is subtitles corresponding to the digital image data 11, the translator inputs a reproduction start tag <point in> into the secondary data 12 at a certain position of the digital image data 11 so as to designate a reproduction start point 32 while reproducing and watching the digital image data 11 at home and the like through a personal computer. In this instance, the reproduction start point 32 corresponding to a certain image frame-specific code 31 of the digital image data 11 is allocated upon inputting the reproduction start tag. After inputting the subtitles and the like, and when the translator inputs a reproduction end tag <point out> at a certain point of the digital image data 11 so as to designate a reproduction end point 33, the reproduction end point 33 corresponding to the certain image frame-specific code 31 is allocated. Preferably, reproduction start tags <point in> and reproduction end tags <point out> are inputted by a simple key-operation. This preparation method allows the translator to display subtitles at any desired space on the digital image data 11 as well as to correct the subtitles easily to improve the quality. Further, the translator prepares the secondary data 12 at home without difficulty and in a short time by using a personal computer and the like, and send the secondary data 12 instantly from his/her home to the client through Internet, leading to improved working efficiency. Further, the client can directly distribute the secondary data 12 that has been transmitted from the translator to user terminals, leading to improved operation efficiency required for distribution of the secondary data 12.

Figure 6:
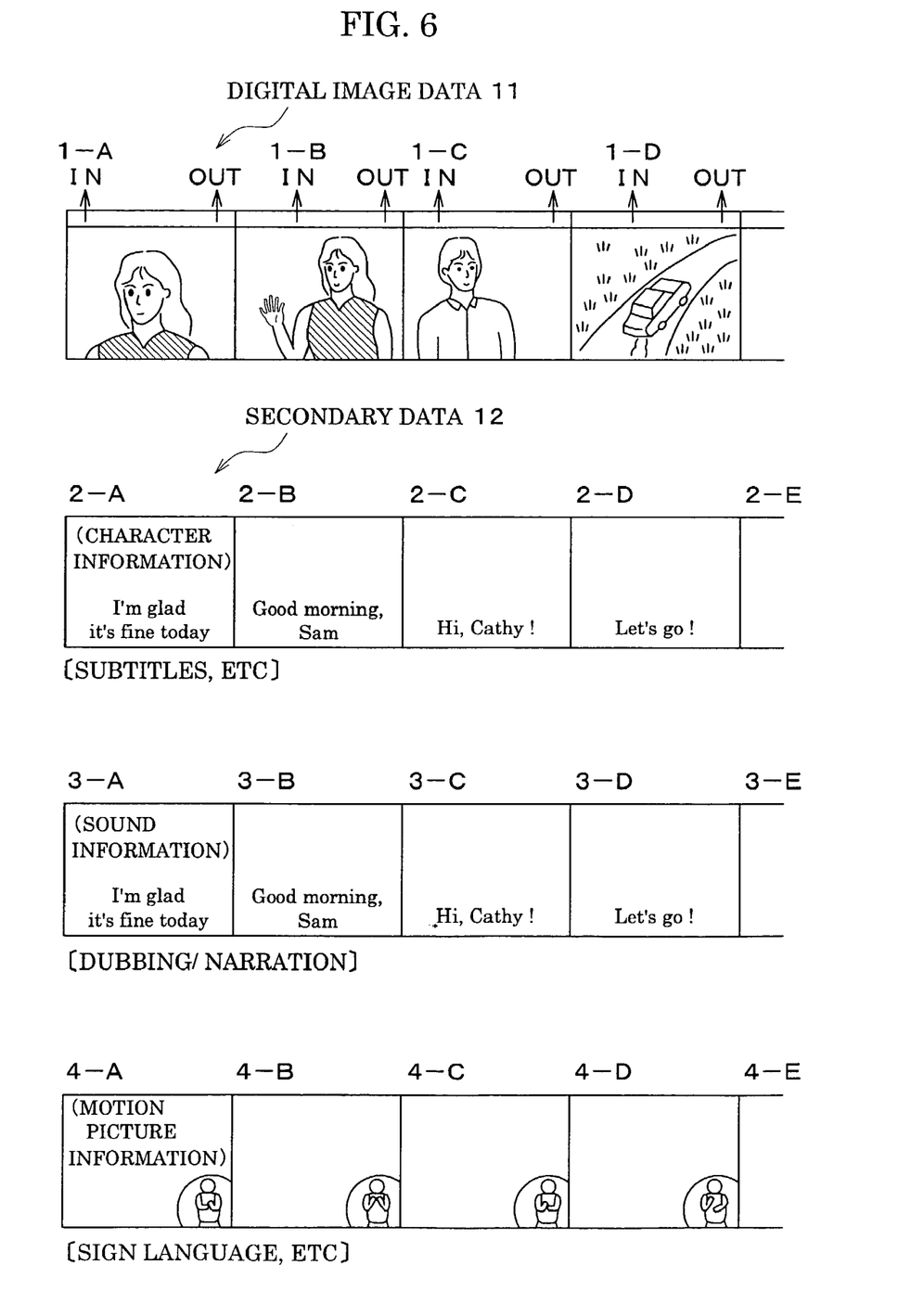
FIG. 6 is an image figure illustrating reproduction of the digital image data and the secondary data.

Next, with reference to FIG. 6, reproduction images of the digital image data 11 and the secondary data 12 will be described. FIG. 6 is an image figure illustrating reproduction of the digital image data 11 and the secondary data 12. In FIG. 6, the digital image data 11 is reproduced by the first reproduction means 24 to reproduce images in order of 1-A, 1-B, 1-C, and 1-D. In this instance, the reproduction start points 32 and the reproduction end points 33 of the secondary data 12 are led out in order by the second reproduction means 25, and subtitles are synchronized with the digital image data 11 in order of 2-A, 2-B, 2-C, and 2-D to carry out reproduction starts (IN) and reproduction ends (OUT).

When the secondary data 11 is dubbing or narration, the sound information 3-A, 3-B, 3-C, and 3-D is reproduced correspondingly to the images 1-A, 1-B, 1-C, and 1-D of the digital image data 11. Likewise, when the secondary data 11 is sign language, the motion picture information 4-A, 4-B, 4-C, and 4-D are reproduced, respectively.

Accordingly, since the secondary data 12 is prepared by a markup language and the second reproduction means 25 leads out the reproduction start point 32 and the reproduction end point 33, the secondary data 12 is reproduced synchronously with the reproduction of the digital image data 11. Further, the secondary data 12 may contain any of character information, sound information, and image information. Therefore, if a great variety of secondary data 12 consisting of these information is prepared, the user can select the optimum secondary data 12 according to his/her favor or purpose.

Figure 7:
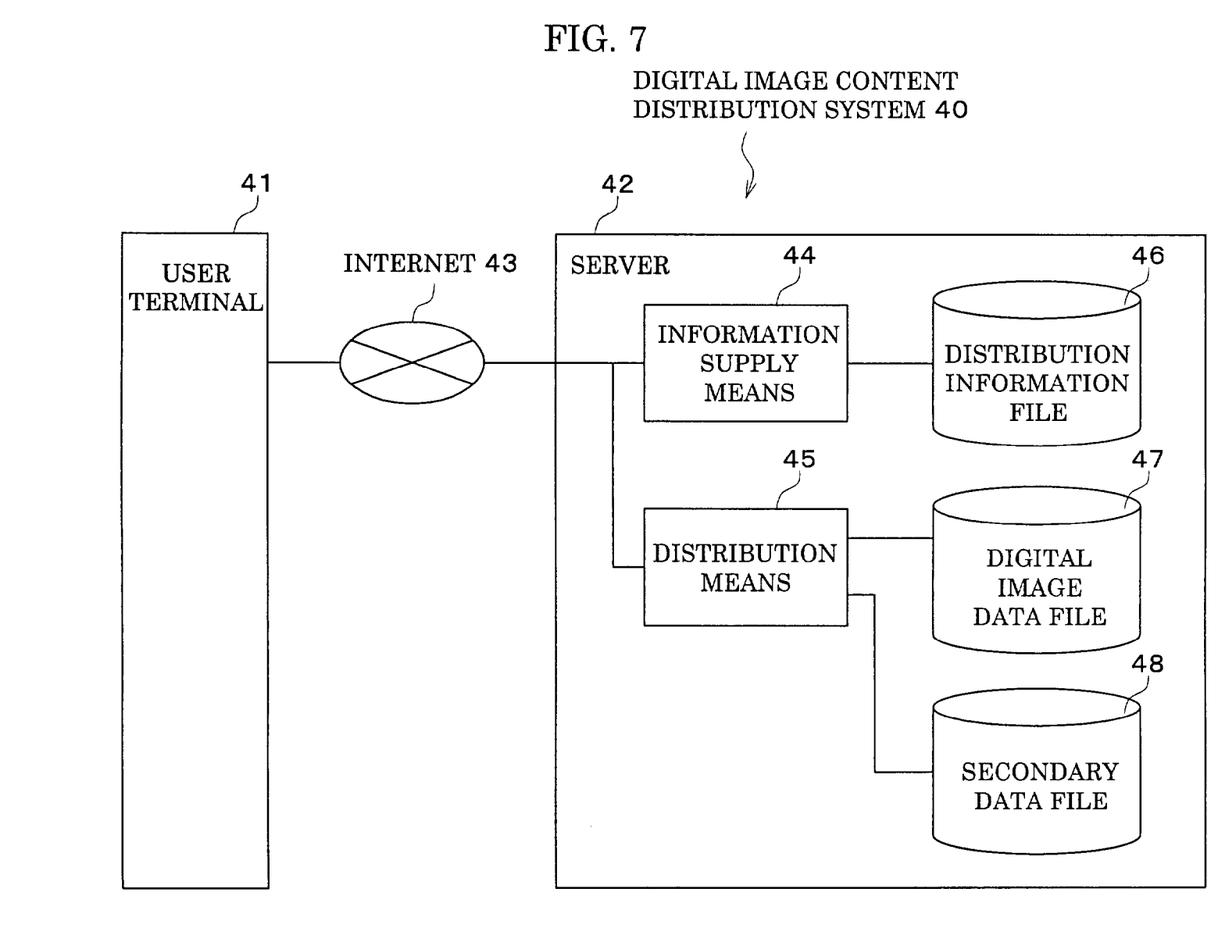
FIG. 7 is a block diagram illustrating the outline of the configuration of a digital image content distribution system using Internet.
Figure 8:
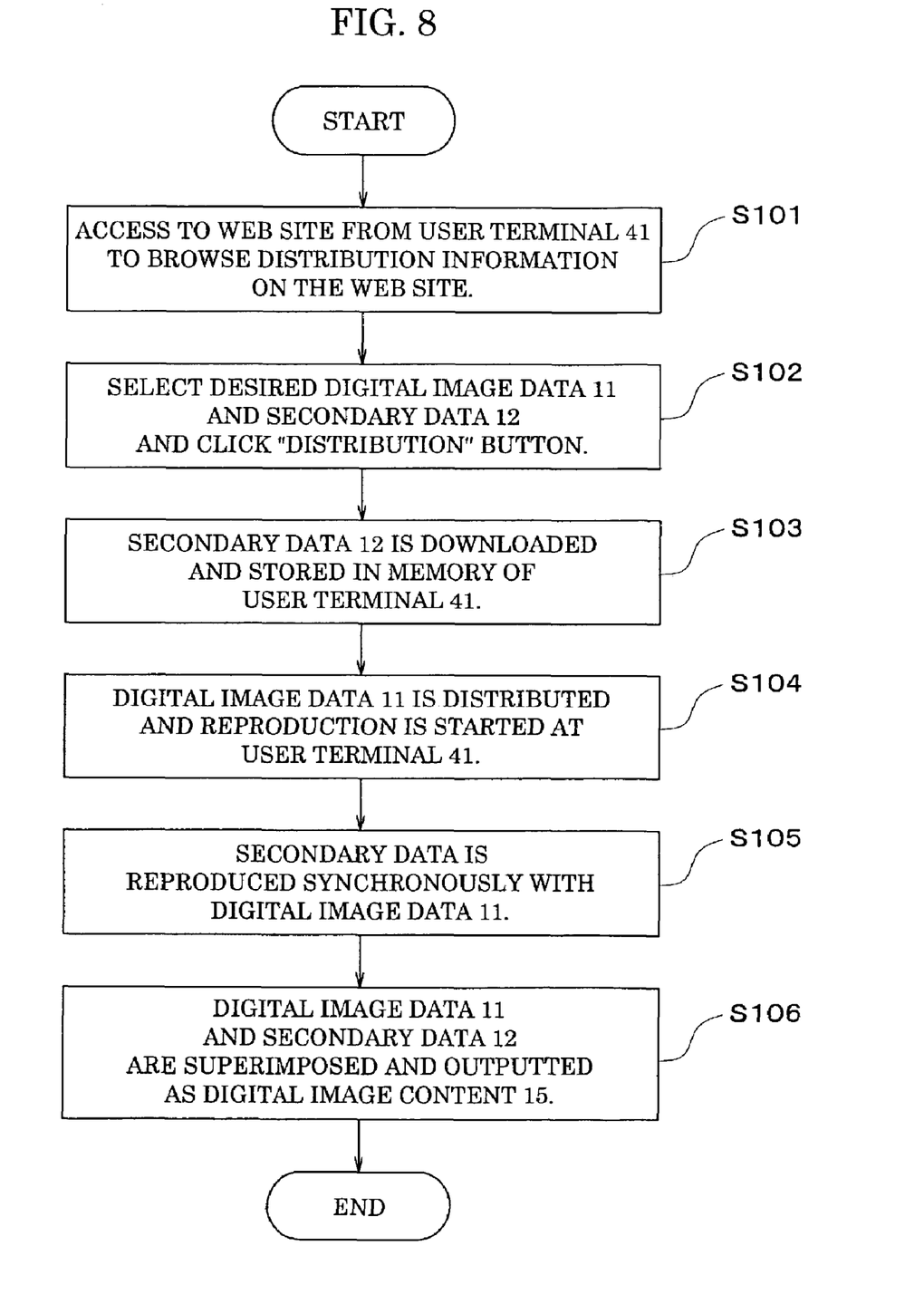
FIG. 8 is a flow chart illustrating the sequence of distribution and reproduction in the digital image content distribution system using Internet.

Next, with reference to FIGS. 7 and 8, a description will be given of one preferred embodiment of a system in which the digital image data 11 and the secondary data 12 are distributed through Internet for the purpose of reproduction. FIG. 7 is a block diagram illustrating the outline of the configuration of a digital image content distribution system 40 using Internet, and FIG. 8 is a flowchart illustrating the sequence of distribution and reproduction of the digital image data 11 and the secondary data 12 in the digital image content distribution system 40.

In FIG. 7, a user terminal 41 is a terminal for which a user operates. A server 42 is a data processing device for distributing the digital image data 11 and the secondary data 12 to a user terminal 41. A plurality of digital image data 11 and a plurality of secondary data 12 are stored in a digital image data file 47 and a secondary data file 48, respectively, and these data can be distributed to a user terminal 41 through a distribution means 45. Information relating to the distribution of these data is stored in a distribution information file 46, and is offered to users by an information supply means 44 for the purpose of browsing. The user terminal 41 and the server 42 are connected through Internet 43.

The information supply means 44 supplies a user with distribution information comprising titles of the digital image data 11 and the secondary data 12 and the profile introduction. The user can access the web site to browse and inspect the distribution information. The distribution information is stored in the distribution information file 46 and renewed at a certain period.

The distribution means 45 controls and processes the distribution of the digital image data 11 and the secondary data 12. When a request for distribution is received from a user, for example, on the basis of the respective title numbers of the digital image data 11 and the secondary data 12 contained in the distribution requirement signal, the corresponding digital image data 11 and the corresponding secondary data 12 are respectively distributed to the user terminal 41 from the digital image data file 47 and the secondary data file 48, respectively.

It is possible that the secondary data 12 is prepared by a plurality of translating languages and advertisements are distributed corresponding to these translating languages. For example, when the secondary data 12 of Korean subtitles is selected, advertisements of Korean companies are distributed in Korean, and when the secondary data 12 of Chinese subtitles is selected, advertisements of Chinese companies are distributed in Chinese. Identification numbers may be allocated to the secondary data 12 to identify translating language categories so that advertisements corresponding to the selected translating language are automatically distributed.

Advertisements may be prepared by using sound information or image in addition to character information. If advertisements are distributed as separate secondary data other than the secondary data 12 containing subtitles, it is possible to reproduce advertisements at any desired time such as at the start or end of, or at an intermediate point of the digital image data 11. Also, the secondary data may be prepared such that advertisements and subtitles are made together, and the advertisements are inserted in an interval of the subtitles.

According to the aforementioned advertisement distribution system, unlike the prior art, advertisements can be readily replaceable and distributable without preparation of a cue sheet.

The server 42 is made by a computer which can deal with multimedia such as character, sound, graphics, and image. The hardware of the server 42 (not shown) consists of a control/process section totally controlling the whole server 42, an input/output control section, a memory device, an input device, a display device, an output device, and a communication section.

The control/process section consists of CPU and an internal memory, and an operation system and other variety of programs executing control processes with respect to the provision of the distribution information and the distribution of the digital image data 11 and the secondary data 12 are expanded. For example, a WWW server soft which functions as a server on the Internet 43, a browser soft which facilitates to browse and inspect distribution information on a web site, a content management program which executes administration or change of distribution information and the digital image data 11 and the secondary data 12, and a distribution program which executes distribution of the digital image data 11 and the secondary data 12 may be included. A program for registering and distributing advertisements is also included.

With these programs the information supply means 44 and the distribution means 45 perform their functions.

The memory device comprises a hard disc, a magnetic disc, or the like, and a distribution information file 46, a digital image data file 47, and a secondary data file 48 are stored in the memory device. When advertisements are distributed, an advertisement file (not shown) is stored in the memory device.

The user terminal 41 is made by a data processing device which can deal with multimedia such as character, sound, graphics, and image, and for example, an existing personal computer may be used. As long as corresponding to the reproduction program, a portable information terminal or a TV may be applicable. The user terminal 41 comprises therein a control/process section (CPU and memory), an input/output control section, a memory device, an input device, a display device, an output device, and a communication section. The secondary data 12 distributed from the server 42 is temporally stored in the memory device. A program for reproducing the digital image data 11 distributed from the server 42, a program for reproducing the secondary data 12 that is temporally stored in the memory section synchronously with the reproduction of the digital image data 11, and a program for superimposing and outputting these two reproduction data are expanded in the control/process section.

The reproduction program of the digital image data 11 can be transferred into the user terminal 41, irrespective of differences of the coding method of the digital image data 11, for example, by downloading a reproducing program corresponding to the digital image data 11 from the server 42 through Internet 43.

The reproduction program of the secondary data 12 does not require a complicated control processing as the reproduction method of the secondary data 12 does not depend on the coding method of the digital image data 11. The reproduction program may be downloaded from the server 42 together with the secondary data 12 when the user requests a distribution of the digital image data 11 and the secondary data 12.

The program for superimposing and outputting the reproduction data of the digital image data 11 and the reproduction data of the secondary data 12 may be prepared separately or together with the reproduction program of the secondary data 12. When prepared as a separate program, likewise the reproduction program of the secondary data 12, it may be downloaded from the server 42.

With reference to a flow chart of FIG. 8, the sequence of distribution and reproduction in the digital image content distribution system 40 will be described. In FIG. 8, the user accesses from the user terminal 41 to a web site which offers use of the digital image content distribution system 40, and browses distribution information displayed on the screen (step S101). The displayed distribution information includes a profile briefly introducing the digital image data 11 and the secondary data 12, respectively.

When the user reads the profile, selects desired digital image data 11 and secondary data 12, and clicks or depresses the "distribution" button (step S102), the selected secondary data 12 is downloaded and stored in the memory device of the user terminal 41 (step S103). Subsequently, the digital image data 11 is distributed and reproduced at the user terminal 41 (step S104). When doing so, the secondary data 12 is reproduced synchronously with the reproduction of the digital image data 11 (step S105). The digital image data 11 and the secondary data 12 are superimposed and outputted to the display device or the output device as the digital image content 15 (step S106).

The present invention is not limited to the above particular embodiments, and various changes and modifications may be made in the invention. For example, the distribution means of the digital image data 11 and the secondary data 12 is not limited to the Internet 43, and other media such as digital broadcasting and CATV may be used. Further, the digital image data 11 may be stored in a recording medium such as a DVD-ROM and the secondary data 12 may be stored in a recording medium such as a CD-ROM so that they can be distributed by mailing service. Further, a program as a reproduction means of the digital image data 11 and the secondary data 12 may be provided through Internet 43 or in the form of a recording media such as a CD-ROM.

Figure 9:
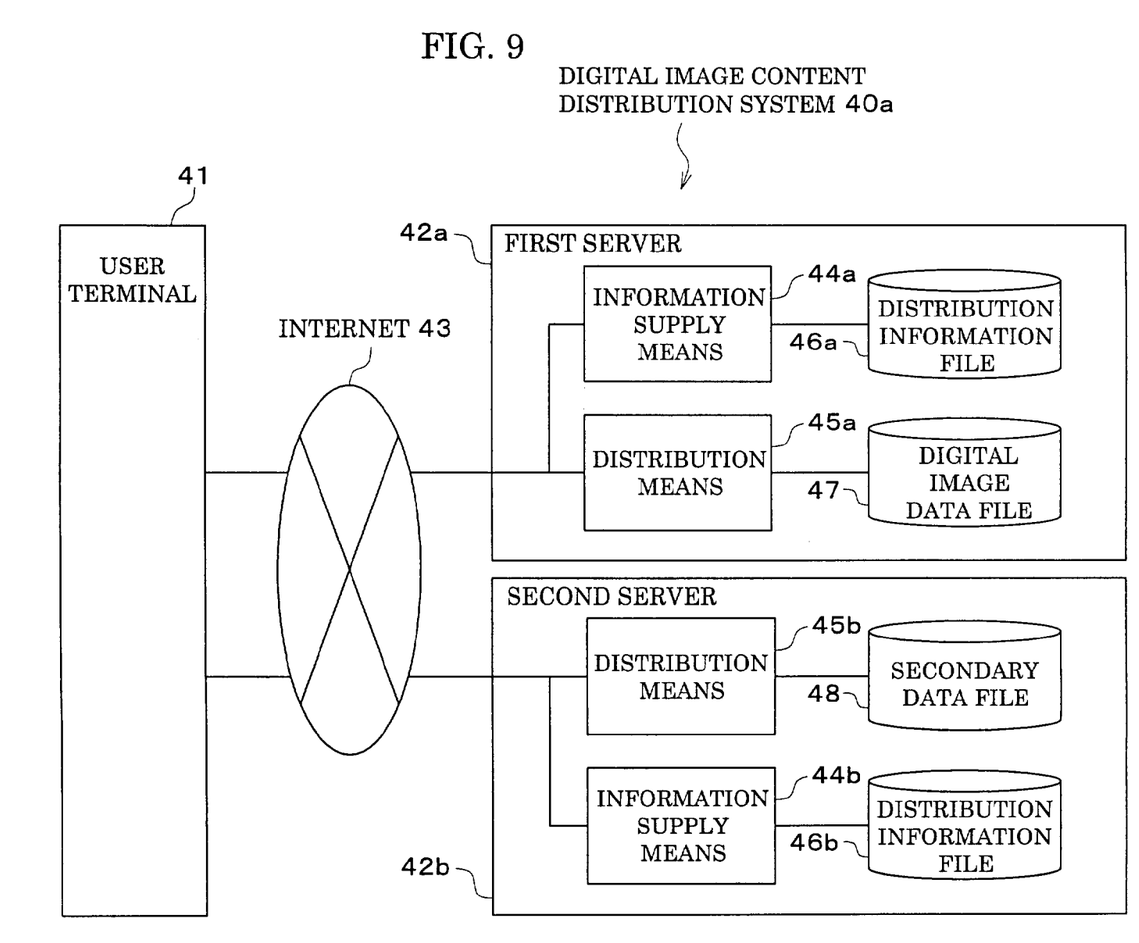
FIG. 9 is a block diagram illustrating the outline of the configuration of another digital image content distribution system using Internet.

When constructing the distribution system using Internet, the distribution information file 46, the digital image data file 47, the secondary data file 48 may be integrated and stored in one server. Alternatively, these files may be stored in respective servers. With reference to FIG. 9, a description will be given of a configuration where the digital image data file 47 and the secondary data file 48 are stored in separate servers. FIG. 9 is a block diagram illustrating the outline of the configuration of a digital image content distribution system 40*a* using Internet. Parts or elements similar to those of the digital image content distribution system 40 will be denoted by the same reference numerals and the description thereof will be omitted.

In FIG. 9, a plurality of digital image data 11 is stored in the digital image data file 47 in the first server 42*a* and a plurality of secondary data 12 is stored in the secondary data file 48 in the second server 42*b*, and the respective data 11, 12 are distributed to the user terminal 41 through the distribution means 45*a* of the first server 42*a* and the distribution means 45*b* of the second server 42*b*. Information with respect to the distribution of each data 11, 12 is stored in the respective distribution information files 46*a*, 46*b*, and by the information supply means 44*a*, 44*b* the user can browse the information through Internet 43. For example, at the user terminal 41, it is possible to superimpose and output the digital image data such as a movie distributed from the first server 42*a* to each country and the secondary data 12 such as subtitles of each translating language distributed from the second server 42*b* established at each country. According to this, the distribution information, the digital image data 11, and the secondary data 12 can be independently edited, registered, and renewed, and advertisements corresponding to the translating language category are distributed together with the secondary data 12, thereby enhancing the commercial value of the secondary data 12 alone. Further, since the digital image data 11 and the secondary data 12 are separately administered and distributed, there is no need to store the digital image data 11 and the secondary data 12 in one server for administration. Therefore, the server 42*b* for distributing the secondary data 12 with relatively small volume of data does not require high data processing capacity, thereby leading to cost reduction for facilities.

INDUSTRIAL APPLICABILITY

As mentioned above, the following advantages are obtained according to the present invention.

In this digital image content distribution system, since the secondary data and the digital image data are separately prepared and synchronously distributed in such a manner that the secondary data is reproduced synchronously with the digital image data, there is no need to reedit the digital image data. This enables to reduce the edit cost. Further, flickering of the subtitles in the prior art system is eliminated.

Further, since the operation of the translator, etc., for designating reproduction start points and reproduction end points on the secondary data is eased a lot, operations required from the preparation of the secondary data to the distribution thereof will be made much more effectively. Especially, edit and correction of the secondary data will be made easily, which leads to improved quality of the secondary data. Multimedia such as character, sound, and image is available for the secondary data, and dubbing or sign language can be handled as data other than the digital image data. Therefore, by separately administrating and distributing the digital image data and the secondary data by different servers, it is possible to enhance the commercial value of the secondary data alone. Further, the server only for distributing the secondary data may be a server with low data processing capacity, thereby leading to cost reduction for facilities. These can reduce a large amount of preparation cost of the secondary data, which discourages companies to prepare the secondary data.

Further, the producer of the secondary data can prepare the secondary data at home without difficulty and in a short time by using a personal computer and the like, and send the secondary data instantly from his/her home to the client. This allows the client to ask the preparation of the secondary data for a producer staying at any place. Especially, when the secondary data is subtitles, the client can easily ask the translation for translators around the world, which enhances the quality of subtitles without increasing the cost.

Further, the user can select and reasonably enjoy desired digital image data and secondary data at any time through Internet. The secondary data may be prepared by a great variety of translating language so that the user can select a desired menu.

Further, since it is possible to distribute appropriate advertisements corresponding to the translating language category of the secondary data, the user can watch the advertisement without awareness. If advertisements are distributed as the secondary data, the advertisements can be readily replaceable and distributable without preparation of a cue sheet.

Further, in this reproduction system, a dedicated hardware is not required for reproducing the digital image data and the secondary data. If a program for reproduction is installed in the existing personal computer, the digital image data and the secondary data can be readily reproduced.

Furthermore, according to the recording medium recording such a reproduction program, it is possible to distribute and sell the software as a commercial product independently of the hardware of the information processing device. If such a reproduction program is executed by the information processing device such as a personal computer, reproduction of the digital image content is achieved.

The invention claimed is:

1. A digital image content distribution system comprising:
a server which distributes digital image data and secondary data which corresponds to the digital image data, the server comprising:
an image data file which stores the digital image data;
a secondary data file which stores the secondary data;
a distribution information file which stores distribution information relating to the digital image data and the secondary data;
a distribution means for distributing the digital image data and the secondary data in accordance with a requirement from the user terminal; and
an information supply means for supplying the user terminal with the distribution information; and
a user terminal which reproduces the distributed digital image data and the distributed secondary data, the server and the user terminal being connected to each other through Internet,
wherein the secondary data is prepared with the use of a markup language such that a reproduction start point and a reproduction end point correspond to an image frame-specific code for specifying an image frame of the digital image data, and
wherein the digital image data and the secondary data are prepared and distributed separately, the secondary data is reproduced synchronously with the digital image data such that the reproduction start point and the reproduction end point of the secondary data corresponding to the image frame to be reproduced are led out during the reproduction of the digital image data.

2. A digital image content distribution system comprising:
a first server which distributes digital image data, the first server comprising:
an image data file which stores the digital image data;
an image data distribution information file which stores distribution information relating to the digital image data;
a distribution means for distributing the digital image data in accordance with a requirement from the user terminal; and an information supply means for supplying the user terminal with the distribution information relating to the digital image data, and;

a second server which distributes secondary data corresponding to the digital image data, the second server comprising:

a secondary data file which stores the secondary data;

a secondary data distribution information file which stores distribution information relating to the secondary data;

a secondary distribution means for distributing the secondary data in accordance with a requirement from the user terminal; and a secondary information supply means for supplying the user terminal with the distribution information relating to the secondary data; and a user terminal which reproduces the distributed digital image data from the first server and the distributed secondary data from the second server, the user terminal connected to the first server and the second server through Internet, wherein the secondary data is prepared with the use of a markup language such that a reproduction start point and a reproduction end point correspond to an image frame-specific code for specifying an image frame of the digital image data, and wherein the digital image data and the secondary data are prepared and distributed separately, the secondary data is reproduced synchronously with the digital image data in a manner such that the reproduction start point and the reproduction end point of the secondary data corresponding to the image frame to be reproduced are led out during the reproduction of the digital image data.

3. A digital image content distribution system according to claim 1 or claim 2, wherein the secondary data is prepared by a plurality of translating languages, and advertisements corresponding to a distributed translating language are automatically distributed.

* * * * *